(12) United States Patent
Roh

(10) Patent No.: US 12,134,000 B2
(45) Date of Patent: *Nov. 5, 2024

(54) WEARABLE DEVICE AND OPERATION METHOD THEREOF

(71) Applicant: SAMSUNG ELECTRONICS CO., LTD., Suwon-si (KR)

(72) Inventor: Changhyun Roh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,467

(22) Filed: Dec. 7, 2022

(65) Prior Publication Data
US 2023/0100432 A1 Mar. 30, 2023

Related U.S. Application Data

(63) Continuation of application No. 17/178,373, filed on Feb. 18, 2021, now Pat. No. 11,541,265.
(Continued)

(30) Foreign Application Priority Data

Sep. 4, 2020 (KR) .......................... 10-2020-0113357

(51) Int. Cl.
*A63B 21/005* (2006.01)
*A63B 21/00* (2006.01)

(52) U.S. Cl.
CPC .... *A63B 21/0058* (2013.01); *A63B 21/00181* (2013.01); *A63B 21/4011* (2015.10)

(58) Field of Classification Search
CPC .......... A63B 21/0004; A63B 21/00181; A63B 21/00185; A63B 21/005; A63B 21/0056;
(Continued)

(56) References Cited

U.S. PATENT DOCUMENTS

2006/0004307 A1 1/2006 Horst
2007/0060849 A1* 3/2007 Bluman ............... A63B 21/153
601/33
(Continued)

FOREIGN PATENT DOCUMENTS

JP 2002-301124 A 10/2002
JP 2013-090844 A 5/2013
(Continued)

OTHER PUBLICATIONS

U.S. Appl. No. 17/178,373, filed Feb. 18, 2021; ROH.
(Continued)

*Primary Examiner* — Zachary T Moore
(74) *Attorney, Agent, or Firm* — NIXON & VANDERHYE P.C.

(57) ABSTRACT

A wearable device may include a motor, a motor driver circuit, a frame connected to the motor, the frame to be worn on the body of the user to support the body, a processor configured to generate a control signal to control an electrical connection in the motor driver circuit, and a sensor configured to sense a body motion of the user. The processor is further configured to provide an exercise load through the frame according to a speed of the sensed body motion by controlling, based on the speed of the body motion, a changing ratio per time between a first control state in which the electrical connection in the motor driver circuit is a closed loop and a second control state in which the electrical connection in the motor driver circuit is an open loop.

19 Claims, 10 Drawing Sheets

Related U.S. Application Data

(60) Provisional application No. 63/024,023, filed on May 13, 2020.

(58) Field of Classification Search
CPC . A63B 21/0058; A63B 21/0059; A63B 21/16; A63B 21/22; A63B 21/4001; A63B 21/4009; A63B 21/4011; A63B 23/0355; A63B 23/04; A63B 23/0405; A63B 23/0429; A63B 23/047; A63B 2024/0009; A63B 2024/0012; A63B 2024/0093; A63B 24/0003; A63B 24/0006; A63B 24/0087; A63B 69/0057; A63B 69/0059; A63B 69/0062; A61H 2001/0203; A61H 2001/0207; A61H 2001/0211; A61H 2001/0248; A61H 2001/0251; A61H 1/02; A61H 1/0237; A61H 1/0266; A61H 2205/10–12

See application file for complete search history.

(56) References Cited

U.S. PATENT DOCUMENTS

| | | | |
|---|---|---|---|
| 2012/0071797 A1 | 3/2012 | Aoki et al. | |
| 2012/0095373 A1 | 4/2012 | Hirata et al. | |
| 2013/0289452 A1* | 10/2013 | Smith | A63B 21/4009 601/33 |
| 2015/0381102 A1* | 12/2015 | Sun | F25D 17/062 62/428 |
| 2016/0107309 A1* | 4/2016 | Walsh | A63B 21/0054 248/550 |
| 2016/0199685 A1* | 7/2016 | von Hoffmann | G06Q 50/01 482/8 |
| 2017/0063278 A1* | 3/2017 | Roh | H02H 7/0854 |
| 2017/0274249 A1* | 9/2017 | Moebius | A63B 23/0405 |
| 2018/0056104 A1* | 3/2018 | Cromie | A61H 3/00 |
| 2018/0116827 A1* | 5/2018 | Lim | A63B 23/0405 |
| 2019/0009133 A1* | 1/2019 | Mettler May | G09B 19/0038 |
| 2019/0209413 A1 | 7/2019 | Lee et al. | |
| 2020/0376324 A1* | 12/2020 | von Hoffmann | A63B 21/0004 |

FOREIGN PATENT DOCUMENTS

| | | |
|---|---|---|
| JP | 2016-002404 A | 1/2016 |
| KR | 2007-0093729 A | 9/2007 |
| KR | 2009-0040720 A | 4/2009 |
| KR | 10-1836413 B1 | 3/2018 |
| KR | 2019-0015458/ | 2/2019 |
| WO | WO 2013/019749 A1 | 2/2013 |
| WO | WO 2018/178897 A1 | 10/2018 |

OTHER PUBLICATIONS

U.S. Appl. No. 63/024,023, filed May 13, 2020; ROH.
International Search Report issued on Jun. 21, 2021 for the corresponding PCT International Application No. PCT/KR2021/002808.
Extended European Search Report dated Nov. 8, 2023 for EP Application No. 21805163.9.
Ma et al., "Design and testing of a regenerative magnetorheological actuator for assistive knee braces", Smart Materials and Structures, IOP Publishing Co., Feb. 7, 2017, vol. 26, No. 3.
Karthik et al., "Design of a Lower Limb Exoskeleton", Apr. 30, 2016; pp. 326-336.

* cited by examiner

WEARABLE DEVICE AND OPERATION METHOD THEREOF

CROSS-REFERENCE TO RELATED APPLICATIONS

This application is a Continuation of U.S. application Ser. No. 17/178,373, filed Feb. 18, 2021, which claims priority to U.S. Provisional Application Ser. No. 63/024,023, filed May 13, 2020, which claims priority to KR 10-2020-0113357, filed Sep. 4, 2020, the entire contents of which are all hereby incorporated herein by reference in their entireties.

BACKGROUND

1. Field

At least one example embodiment relates to a wearable device that is worn on a body of a user to provide an exercise function and/or an operation method of the wearable device.

2. Description of the Related Art

In general, a walking assistance device refers to a mechanism or a device that helps a patient, who cannot walk on his own due to various diseases, accidents, and the like, to perform walking exercises for rehabilitation treatment. With the recent intensifying aging societies, a growing number of people experience inconvenience in walking or have difficulty in normal walking due to malfunctioning joint issues, and there is increasing interest in walking assistance devices. A walking assistance device is worn on a body of a user to assist the user with walking by providing a desired (or, alternatively, a necessary) muscular strength and to induce the user to walk in a normal walking pattern.

SUMMARY

Some example embodiments relate to a wearable device for providing a user with an exercise load while being worn on a body of the user.

In some example embodiments, the wearable device includes a frame configured to be worn on the body of the user to support the body; a motor configured to attach to the frame; a motor driver circuit connected to the motor; a sensor configured to sense a body motion of the user; and a processor configured to generate a control signal to control an electrical connection in the motor driver circuit to provide the exercise load through the frame according to a speed of the body motion by controlling, based on the speed of the body motion, a changing ratio per time between a first control state and a second control state, the first control state being a state in which the electrical connection in the motor driver circuit is a closed loop and the second control state being a state in which the electrical connection in the motor driver circuit is an open loop.

In some example embodiments, the processor is further configured to periodically and alternately repeat switching between the first control state and the second control state based on the changing ratio per time.

In some example embodiments, the processor is further configured to, determine the speed of the body motion based on the body motion, and adjust the changing ratio per time between a duration of the first control state and a duration of the second control state based on the determined speed.

In some example embodiments, the processor is further configured to adjust the changing ratio per time to correspond to a second speed, if the speed of the body motion changes from a first speed to the second speed.

In some example embodiments, the processor is further configured to adjust the changing ratio per time by reducing the duration of the first control state and increasing the duration of the second control state, if the second speed is greater than the first speed.

In some example embodiments, the processor is further configured to adjust the changing ratio per time by increasing the duration of the first control state and reducing the duration of the second control state, if the second speed is less than the first speed.

In some example embodiments, the processor is further configured to adjust the changing ratio per time based on a target exercise load and the speed of the body motion.

In some example embodiments, the processor is configured to receive an input of the target exercise load from the user.

In some example embodiments, the processor is further configured to generate the exercise load by forming the closed loop in the first control state without driving the motor using power of a battery.

In some example embodiments, the processor is further configured to control the motor to generate a torque in a direction that hinders the body motion by supplying the motor with power of a battery, and generating the exercise load by controlling a change between the first control state and the second control state.

In some example embodiments, the motor driver circuit includes a plurality of switches configured to control the electrical connection in the motor driver circuit based on the control signal output from the processor.

In some example embodiments, the wearable device is configured to be worn on a lower body of the user to provide a resistive force to the lower body of the user.

Other example embodiments relate to an operation method of a wearable device for providing a user with an exercise load while being worn on a body of the user.

In some example embodiments, the method may include sensing, via a sensor, a body motion of the user; and generating a control signal to control an electrical connection in a motor driver circuit of the wearable device based on a speed of the body motion to provide the exercise load through the frame according to the speed of the body motion by controlling, based on the control signal, a changing ratio per time between a first control state and a second control state, the first control state being a state in which the electrical connection in the motor driver circuit is a closed loop and the second control state being a state in which the electrical connection in the motor driver circuit is an open loop.

In some example embodiments, the generating the control signal generates the control signal to periodically and alternately repeat switching between the first control state and the second control state.

In some example embodiments, the generating the control signal includes determining the speed of the body motion based on the body motion; and generating the control signal to adjust the changing ratio per time between a duration of the first control state and a duration of the second control state based on the speed of the body motion.

In some example embodiments, the generating the control signal includes generating the control signal to adjust the changing ratio per time to correspond to a second speed, in response to the speed of the body motion changing from a first speed to the second speed.

In some example embodiments, the generating the control signal includes generating the control signal to adjust the changing ratio per time by reducing the duration of the first control state and increasing the duration of the second control state, in response to the second speed being greater than the first speed.

In some example embodiments, the generating the control signal includes generating the control signal to adjust the changing ratio per time by increasing the duration of the first control state and reducing the duration of the second control state, in response to the second speed being less than the first speed.

Some example embodiments relate to a non-transitory computer-readable storage medium storing instructions that, when executed by a processor, cause the processor to perform an operation method of a wearable device for providing a user with an exercise load while being worn on a body of the user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
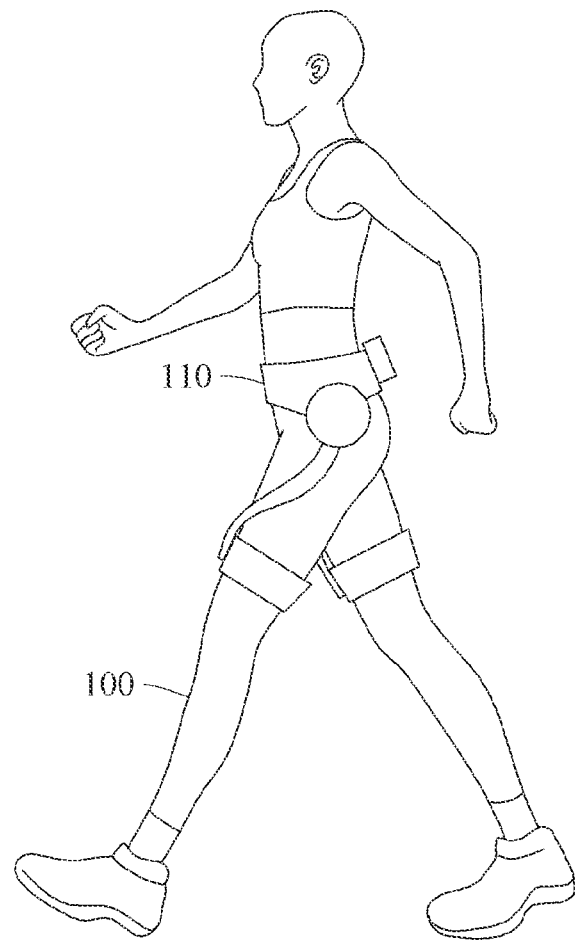
FIG. 1 illustrates a wearable device worn on a user according to an example embodiment.

The following detailed structural or functional description is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all terms used herein including technical or scientific terms have the same meanings as those generally understood by one of ordinary skill in the art. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates a wearable device worn on a user according to an example embodiment.

Referring to FIG. 1, a wearable device 110 is a device that is worn on a body of a user 100 to assist the user 100 with an exercise. The wearable device 110 may be worn on a lower body (legs, ankles, knees, etc.), an upper body (torso, arms, wrists, etc.), or the waist of the user 100 to provide a resistive force to a body motion of the user 100, thereby enhancing the exercise effect for the user 100. The resistive force is provided to hinder the motion of the user 100 or to provide resistance to the motion of the user 110, and may be a force that acts in a direction opposite to the direction of the motion of the user 100 when the user 100 moves. Hereinafter, the resistive force may also be referred to as an "exercise load". The wearable device 110 may further enhance the exercise effect of the user 100 by providing an exercise load to the body of the user 100 while being worn on the legs. The user 100 may perform a walking motion while wearing the wearable device 110 for exercise. In this case, the wearable device 110 may apply an exercise load to the legs of the user 100 during the walking motion of the user 100. Hereinafter, the wearable device 110 worn on the lower body (legs) will be described as an example. However, as described above, the wearable device 110 may be worn on a body part other than the lower body, and the shape and configuration thereof may vary depending on the body part on which the wearable device 110 is worn. In the description below, the "legs" may be replaced with another body part.

The wearable device 110 may also function to assist the user 100 with walking, in addition to assisting the user 100 with exercise as described above. For example, the wearable device 110 may help the user 100 to walk by assisting one or each of the legs of the user 100. The wearable device 110 may enable the user 100 to walk independently or to walk for a long time by providing a force required for the user 100 to walk, thereby extending the walking ability of the user 100. The force provided to assist the user with walking may be in a direction opposite the resistance force provided to hinder the motion of the user 100. Alternatively, the wearable device 110 may improve the abnormal walking habit or walking posture of a user.

Figure 2:
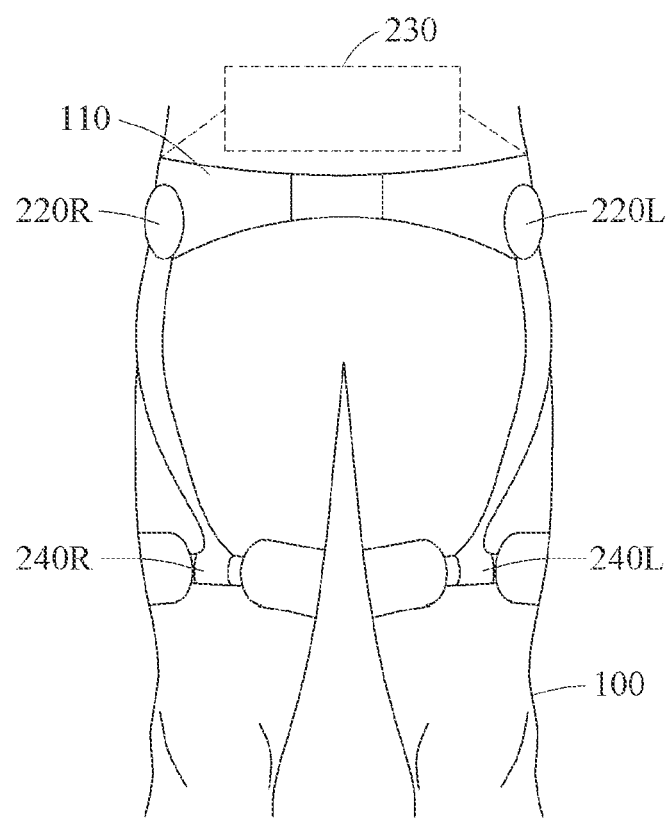
FIG. 2 illustrates an outer structure of a wearable device according to an example embodiment.

FIG. 2 illustrates an outer structure of a wearable device according to an example embodiment.

Referring to FIG. 2, the wearable device 110 includes a frame configured to fix the wearable device 110 to the body of the user 100 and support the body when the wearable device 110 is worn on the body of the user 100. The frame may include, for example, a waist-worn frame configured to fix the wearable device 110 to the waist of the user 100 and leg-worn frames to be worn on the legs of the user 100 to fix a portion of the wearable device 110 to the legs of the user 100. Depending on the implementation form of the wearable device 110, the shape or configuration of the frame may be modified to suit the implementation form.

In an example embodiment, a main circuit (or, alternatively, a controller) 230, in which a processor, a memory, and the like are disposed for controlling the operation of the wearable device 110, may be placed behind the lower back of the user 100. In the vicinity of each of the left and right hip joints 220L and 220R of the user 100, a motor to be controlled by the processor and a sensor configured to sense a body motion of the user 100 may be disposed.

When power is supplied to the motor in the vicinity of each of the left and right hip joints 220L and 220R, the motor operates. In this case, the force output from the motor is transmitted to each leg-worn frame through each of left and right transmitting parts 240L and 240R, and the force transmitted to the leg-worn frame is applied to the leg of the user 100. If the user moves the left leg, the leg-worn frame worn on the left leg moves together, and the movement of the leg-worn frame may be sensed by the sensor disposed in the vicinity of the left hip joint 220L through the left transmitting part 240L. For example, an encoder may be disposed in the vicinity of the left hip joint 220L to measure a rotation position or a rotation speed of the motion of the left transmitting part 240L corresponding to the movement of the left leg. If the user moves the right leg, the leg-worn frame worn on the right leg moves together, and the movement of the leg-worn frame may be sensed by the sensor, such as an encoder, disposed in the vicinity of the right hip joint 220R through the right transmitting part 240R. The encoder may measure a rotation position or rotation speed of the movement of the right transmitting part 240R corresponding to the movement of the right leg.

When the wearable device 110 operates in an exercise mode, the wearable device 110 may generate a target exercise load by controlling an electrical connection in a motor driver circuit, without driving the motor included in the wearable device 110 by supplying the motor with power. In this case, the exercise load that acts in the opposite direction of the body motion of the user 100 is generated by the motor of the wearable device 110 and transmitted to the body of the user 100 through the leg-worn frame through each of the left and right transmitting parts 220L and 220R. Meanwhile, the wearable device 110 may control the electrical connection in the motor driver circuit to be adaptive to a body motion speed of the user 100, thereby stably generating the target exercise load even if the body motion speed of the user 100 changes. Hereinafter, the configuration and operation of the wearable device 110 will be described further with reference to the drawings.

Figure 3:
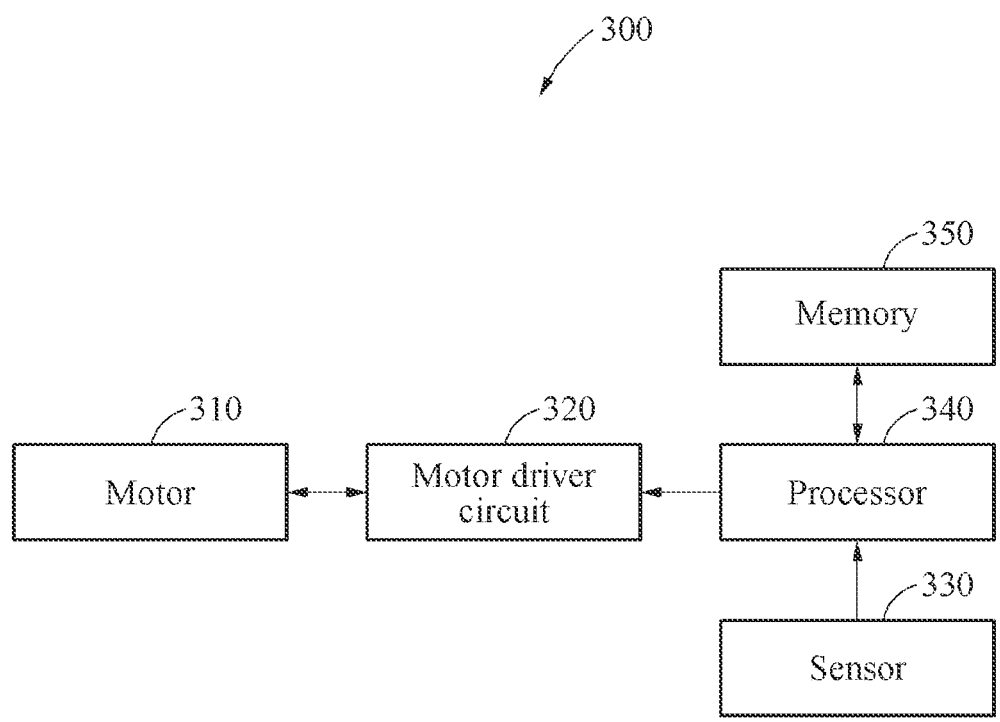
FIG. 3 illustrates a configuration of a wearable device according to an example embodiment.

FIG. 3 illustrates a configuration of a wearable device according to an example embodiment.

Referring to FIG. 3, a wearable device 300 may be a block diagram of the electronic elements included in the wearable device 100. The wearable device 300 may generate an exercise load by repeatedly controlling a switch connection in a motor driver circuit 320 without driving a motor 310 by supplying the motor 310 with power. Through this control, the exercise load may be generated without supplying the motor 310 with power of a battery that supplies power to the wearable device 300. Thus, the power consumption of the battery may be relatively reduced, which may result in an increase in runtime of the wearable device 300. Also, since the motor 310 is not directly driven by receiving power, relatively less noise may be generated for the exercise load than a case in which the motor 310 is driven. In addition, the wearable device 300 may provide the user with an exercise load in a desired or predetermined magnitude (or strength) by monitoring the motion of the user and adaptively controlling the switch connection in the motor driver circuit 320 according to the motion of the user. Hereinafter, the operation of the wearable device 300 will be described in more detail based on the components of the wearable device 300.

Figure 4:
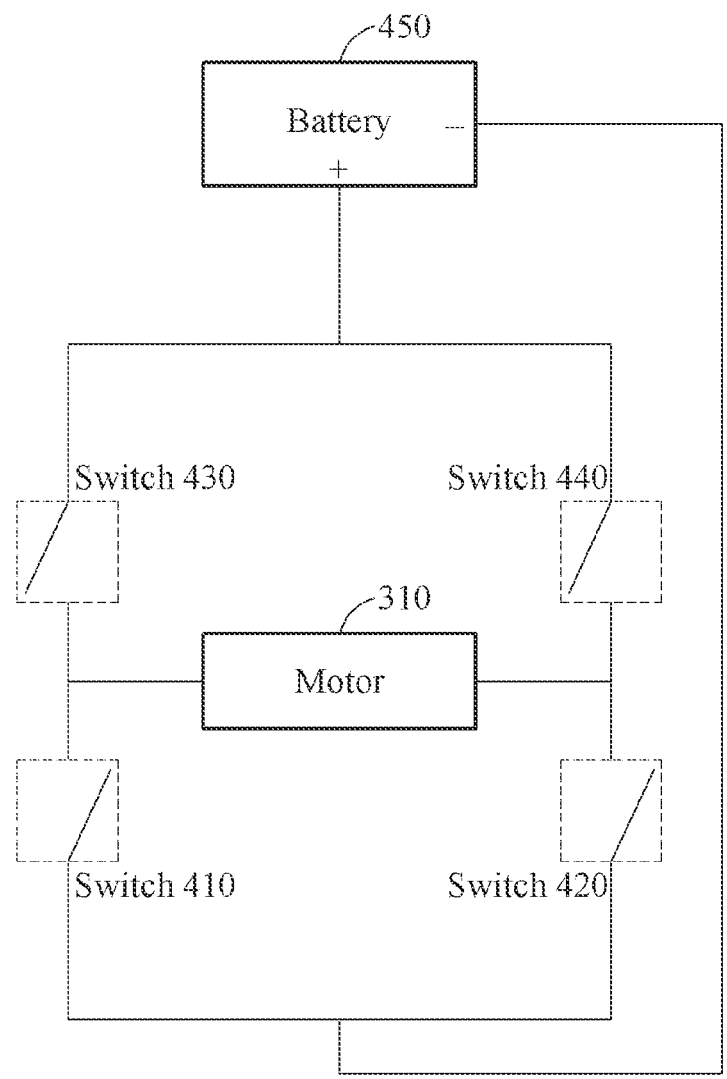
FIG. 4 illustrates an operation of a motor driver circuit according to an example embodiment.

The wearable device 300 includes the motor 310, the motor driver circuit 320, a sensor 330, a processor 340, and a memory 350. Further, as illustrated in FIG. 4, the wearable device 300 may further include a battery 450.

In some example embodiments, the battery 450 may be a rechargeable battery, such as a lithium ion battery, for example, a lithium iron phosphate (LiFePO4) battery, and the wearable device 300 may include a battery management system (BMS) that displays the remaining battery amount to the user to intelligently control the wearable device 300 to conserve and/or generate power.

When the motor 310 is driven by receiving power, the motor 310 may provide a force to assist the user with the leg motion or to hinder the leg motion. The motor 310 may include at least two motors, and the motors may be located in the vicinity of respective ones of the hip joints of the user when the user wears the wearable device 300. In this case, the motor located in the vicinity of the right hip joint may provide a force to assist and/or hinder a motion of the right leg, and the motor located in the vicinity of the left hip joint may provide a force to assist and/or hinder a motion of the left leg.

In some example embodiments, the processor 340 may determine whether to drive the power to provide the force to assist the user with the leg motion and/or to hinder the leg motion based on the remaining battery amount. For example, the processor 340 may attempt to conserve battery power and not provide the additional force to hinder the leg motion of the user when the remaining battery amount is below a threshold.

The wearable device 300 may operate in a walking assistance mode for helping the user to walk or in an exercise mode for hindering the leg motion of the user to increase the exercise effect of the user. In the walking assistance mode, the motor 310 may output an assistance force to help the user to walk. In the exercise mode, the motor 310 may generate an exercise load through the control of the switch connection in the motor driver circuit 320 while power is not supplied to the motor 310, as described above. Alternatively, the motor 310 may generate an artificial force that hinders the leg motion of the user based on the power supplied to the motor 310 as well as the control of the switch connection in the motor driver circuit 320. For example, when it is difficult to generate a target exercise load only by controlling the switch connection in the motor driver circuit 320, the motor 310 may be additionally driven to generate the force to hinder the body motion of the user.

The motor driver circuit 320 is a circuit that controls the operation of the motor 310 under the control of the processor 340, and may control a path of current supplied to the motor 310 or an electrical connection around the motor 310. The motor driver circuit 320 may drive the motor 310 or stop driving the motor 310 based on a control signal received from the processor 340. The motor driver circuit 320 may include a plurality of switches for controlling the electrical connection around the motor 310, and the switches of the motor driver circuit 320 may be controlled based on the control signal received from the processor 340. The motor driver circuit 320 may include a separate internal processor configured to control the switches. In this case, the internal processor may receive a control signal from the processor 340 and control the switches based on the received control signal.

In an example embodiment, the motor driver circuit 320 may include a control circuit, such as an H-bridge circuit, for controlling the electrical connection around the motor 310. The H-bridge circuit is a circuit capable of switching the polarity of a voltage applied to a load such as the motor 310. An example of the H-bridge circuit is shown in FIG. 4.

FIG. 4 illustrates an operation of a motor driver circuit according to an example embodiment.

Referring to FIG. 4, the H-bridge circuit controls the electrical connection around the motor 310 through a plurality of switches 410, 420, 430, and 440. The switches 410, 420, 430, and 440 may be implemented as a semiconductor device such as a metal-oxide-semiconductor field-effect transistor (MOSFET). When the first switch 410 and the fourth switch 440 are turned on (or shorted), and the second switch 420 and the third switch 430 are turned off (or open) under the control of the processor 340, power may be supplied from the battery 450 to the motor 310. Alternatively, when the second switch 420 and the third switch 430 are turned on, and the first switch 410 and the fourth switch 440 are turned off under the control of the processor 340, power may be supplied from the battery 450 to the motor 310. When both the third switch 430 and the fourth switch 440 are turned off, power is not supplied from the battery 450 to the motor 310.

Referring to FIG. 3 again, the sensor 330 may sense a leg motion as a body motion of the user, and transmit information on the sensed leg motion to the processor 340. The sensor 330 may include one or more sensors configured to sense a hip joint angle, a leg motion speed or acceleration, and a leg motion direction of the user, for example, an encoder, an acceleration sensor, an inertial sensor, a gyro sensor, and the like. When the sensor 330 includes an encoder, the encoder may detect a rotation speed and a rotation position of an encoder shaft according to the leg motion of the user. The rotation angle of the encoder shaft may correspond to the joint angle of the user. The encoder may transmit a bit value corresponding to the rotation position of the shaft to the processor 340, and the processor 340 may calculate the rotation angle of the shaft based on the received bit value. The processor 340 may calculate, based on a difference between bit values received at different times, the rotation speed (angular velocity) or a change in the rotation angle of the shaft during a corresponding period of time. Herein, the "speed of a body motion" may refer to such a rotation speed (angular velocity) or change in rotation angle.

The processor 340 controls the overall operation of the wearable device 300. The processor 340 may be part of a controller that includes may include processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc.

The processor 350 may include one or more special purpose processors that stably generates the target exercise mode by controlling an electrical connection in a motor driver circuit 320 based on a body motion speed of the user 100.

The memory 350 stores information or data necessary for the processor 340 to perform a processing operation. For example, the memory 350 may store instructions to be executed by the processor 340. The memory 350 may include a random-access memory (RAM), a dynamic random-access memory (DRAM), a static random-access memory (SRAM), or another type of non-volatile memory known in the art.

The control operation of the wearable device 300 may be implemented by a control signal output from the processor 340. The processor 340 may generate the control signal to control the electrical connection in the motor driver circuit 320. When the wearable device 300 operates in the exercise mode, the processor 340 may control the switch connection in the motor driver circuit 320 based on the speed of the leg motion of the user sensed by the sensor 330, to provide an exercise load to the user.

Control states for the switch connection in the motor driver circuit 320 may include a first control state in which the electrical connection in the motor driver circuit 320 is a closed loop and a second control state in which the electrical connection in the motor driver circuit 320 is an open loop. The processor 340 may provide the exercise load through the frame of the wearable device 300 according to the speed of the leg motion of the user by controlling a changing ratio per time between the first control state and the second control state. To form the exercise load, the processor 340 may control the control state for the motor driver circuit 320 so that the first control state and the second control state are periodically and alternately repeated. The first control state is a state in which the motor 310 is not connected to the battery 450 and the circuit including the motor 310, the switch 410, and the switch 420 forms an electrically closed loop. In the first control state, both terminals of the motor 310 are connected to each other, such that the resistance in the closed loop including the motor 310, the switch 410, and the switch 420 is very low. (Since the voltages at both terminals of the motor 310 are the same, the resistance in the closed loop may be "0" in theory according to Ohm's law.) In this circuit state, the property of maintaining a very low resistance in the closed loop induces a force in a direction not to generate an electromotive force even when the electromotive force is small. Here, the electromotive force is a voltage generated in the motor 310 when the motor 310 rotates. Thus, a great rotation resistance may be generated to hinder the rotation of the motor 310. When the frame of the wearable device 300 is moved by the body motion of the user wearing the wearable device 300, the movement of the frame is transmitted to the motor 310, and an electromotive force is generated in the motor 310. In this example, the motor driver circuit 320 is in a closed loop state, such that a rotation resistance, which is a resistance or resistive force that cancels the electromotive force from the motor 310, is generated.

An outer frame of the wearable device 300 is worn on the body (for example, the legs) of the user and moves in the same direction as the body of the user, and the outer frame provides the body of the user with the rotation resistance received from the motor 310. As described above, in the first control state, a great magnitude of rotation resistance is generated in response to the body motion of the user. When the user tries to move the body with the outer frame worn in this situation, the rotation resistance acts on the body through the outer frame, and the user feels a strong resistive force. The second control state is a state in which the connection in the circuit including the motor 310 is open, and thus there is no electrical connection for the motor 310. In the second control state, no electrical force or rotation resistance is generated, and thus the user feels a minimum resistive force.

The processor 340 may generate an exercise load by controlling a changing ratio per time between the first control state and the second control state, without driving the motor 310 using the power of the battery. In another example embodiment, the processor 340 may control the motor 310 to generate a torque in a direction that hinders the leg motion of the user by supplying the motor 310 with the power of the battery, in addition to generating the exercise load by controlling the changing ratio per time between the first control state and the second control state. In response to the determination that it is difficult to achieve a target exercise load by the rotation resistance induced by controlling the electrical connection in the motor driver circuit 320, the processor 340 may drive the motor 310 to generate a torque to hinder the leg motion.

The processor 340 may control the magnitude of the exercise load by adjusting a control ratio between a duration of the first control state and a duration of the second control state within one repetition period. A control signal for adjusting the control ratio may be implemented, for example, in the form of a pulse width modulation (PWM) signal, which is a signal that may determine the control state according to a duty ratio of the signal pulse width. In this case, a high level value of the PWM signal may correspond to the first control state, and a low level value of the PWM signal may correspond to the second control state. In general, the exercise load applied to the user increases as the proportion of the first control state in a single period increases over that of the second control state. Further, the exercise load increases as the speed of the leg motion of the user increases.

When the user exercises while moving his legs, the leg motion speed of the user may change over time. Even if the electrical connection in the motor driver circuit 320 is not considered, the user may feel a different exercise load according to the leg motion speed when the leg motion speed changes over time. For example, in a situation in which the ratio between the first control state and the second control state is fixed, the user may feel a relatively great exercise load when the leg motion speed of the user increases. A great change in the leg motion speed may cause a drastic change in the exercise load, which may produce discomfort for the user. In controlling the motor driver circuit 320 that controls the electrical connection around the motor 310, the processor 340 may inhibit (or, alternatively, prevent) the generation of an exercise load in an unintended magnitude according to the leg motion speed described above, by adjusting the ratio between the duration of the first control state and the duration of the second state in consideration of the leg motion of the user.

In an example embodiment, the processor 340 may determine the speed of the leg motion of the user based on angular velocity information of the leg motion received from the sensor 330, and control the motor driver circuit 320 based on a target exercise load to be provided to the user and the determined speed of the leg motion. The electrical connection in the motor driver circuit 320 may be adjusted according to a change in the speed of the leg motion over time. To provide the same exercise load to the user, the control ratio, which is the ratio between the duration of the first control state and the duration of the second control state following the first control state may be adjusted according to the leg motion speed. For example, if the speed of the leg motion of the user changes from a first speed to a second speed, the processor 340 may adjust the ratio between the duration of the first control state and the duration of the second control state to correspond to the second speed. If the second speed is greater than the first speed (that is, if the speed of the leg motion is faster than before), the processor 340 may adjust the control ratio by reducing the duration of the first control state and increasing the duration of the second control state. Conversely, if the second speed is less than the first speed (that is, if the speed of the leg motion is slower than before), the processor 340 may adjust the control ratio by increasing the duration of the first control state and reducing the duration of the second control state.

Assuming that the control signal is implemented in the form of a PWM signal and that the wearable device 330 aims to apply an exercise load in the same magnitude to the body of the user with time, the processor 340 may reduce the ratio of maintaining a high level value and increase the ratio of maintaining a low level value within each period of the PWM signal if the speed of the leg motion of the user is faster than before. Conversely, if the speed of the leg motion of the user is slower than before, the processor 340 may increase the ratio of maintaining a high level value and reduce the ratio of maintaining a low level value within each period of the PWM signal.

The relationship among the leg motion speed of the user, the control ratio between the duration of the first control state and the duration of the second control state, and the magnitude (or strength) of the exercise load may be determined (or, alternatively, predetermined) by a control model. Information about the control model may be stored in the memory 350.

In advance, a torque value corresponding to the exercise load may be measured by a torque sensor configured to measure a torque when a desired (or, alternatively, a predetermined) control ratio applied to the motor driver circuit 320 and desired (or, alternatively, predetermined) rotation speeds corresponding to various leg motion speeds of the user are given. By performing this measurement process for various rotation speeds and various control ratios, data on a level of exercise load for each rotation speed and control ratio may be collected. The control model for defining the relationship among the leg motion speed, the control ratio, and the magnitude of the exercise load may be generated based on the collected data, and the control model may output a value of the control ratio that needs to be set for generating a target exercise load when the speed of a current leg motion is given. The ratio between the duration of the first control state and the duration of the second control state may be determined according to the output value. The control model may be defined by, for example, a mapping table or a relational expression. For example, a value to which the control ratio is to be set according to each defined leg motion speed and a magnitude (or strength) of the exercise load may be determined in advance and defined in the form of a mapping table. The relationship among respective desired (or, alternatively, predetermined) values of the leg motion speed, the control ratio, and the target exercise load may be defined by the mapping table, and the other values may be determined through a proportional expression. For example, the mapping table may be defined as shown in Table 1 below.

TABLE 1

|    | V1 | V2 | ... | Vn |
|----|----|----|-----|-----|
| T1 | P1 |    |     |     |
| T2 |    | P2 |     |     |
| ... |   |    | ... |     |
| Tn |    |    |     | Pn  |

In Table 1, V1, V2, . . . , Vn correspond to different leg motion speeds, and T1, T2, . . . , Tn correspond to different target exercise loads. P1, P2, . . . , Pn are values of control ratios (ratios between the duration of the first control state and the duration of the second control state) that are set for the user to feel the target exercise loads, when the leg motion speeds and target exercise loads are given.

As another example, a relational expression in which the leg motion speed and the magnitude (or strength) of the exercise load are independent variables and the value of the control ratio is a dependent variable may be defined in advance. When a target exercise load and a leg motion speed are input to the relational expression, the relational expression may provide a value of a control ratio (a ratio between the duration of the first control state and the duration of the second control state) that needs to be set for the user to feel the target exercise load.

The processor 340 may determine, based on the control model described above, the ratio of the duration of the first control state and the duration of the second control state to be applied to the motor driver circuit 320 based on the target exercise load to be provided to the users and the leg motion speed of the user. The magnitude (or strength) of the target exercise load may be set by the user or may be set in real time in the middle of exercise according to an exercise state of the user or a determined (or, alternatively, a predetermined) time by the processor 340 executing software configured to manage an exercise program for assisting the user with an exercise (the program configured to adjust an exercise intensity depending on the type and time of an exercise). The processor 340 may control the electrical connection in the motor driver circuit 320 based on the determined control ratio, thereby providing the user with a target exercise load in an originally intended magnitude, irrespective of the current leg motion speed of the user.

Figure 5:
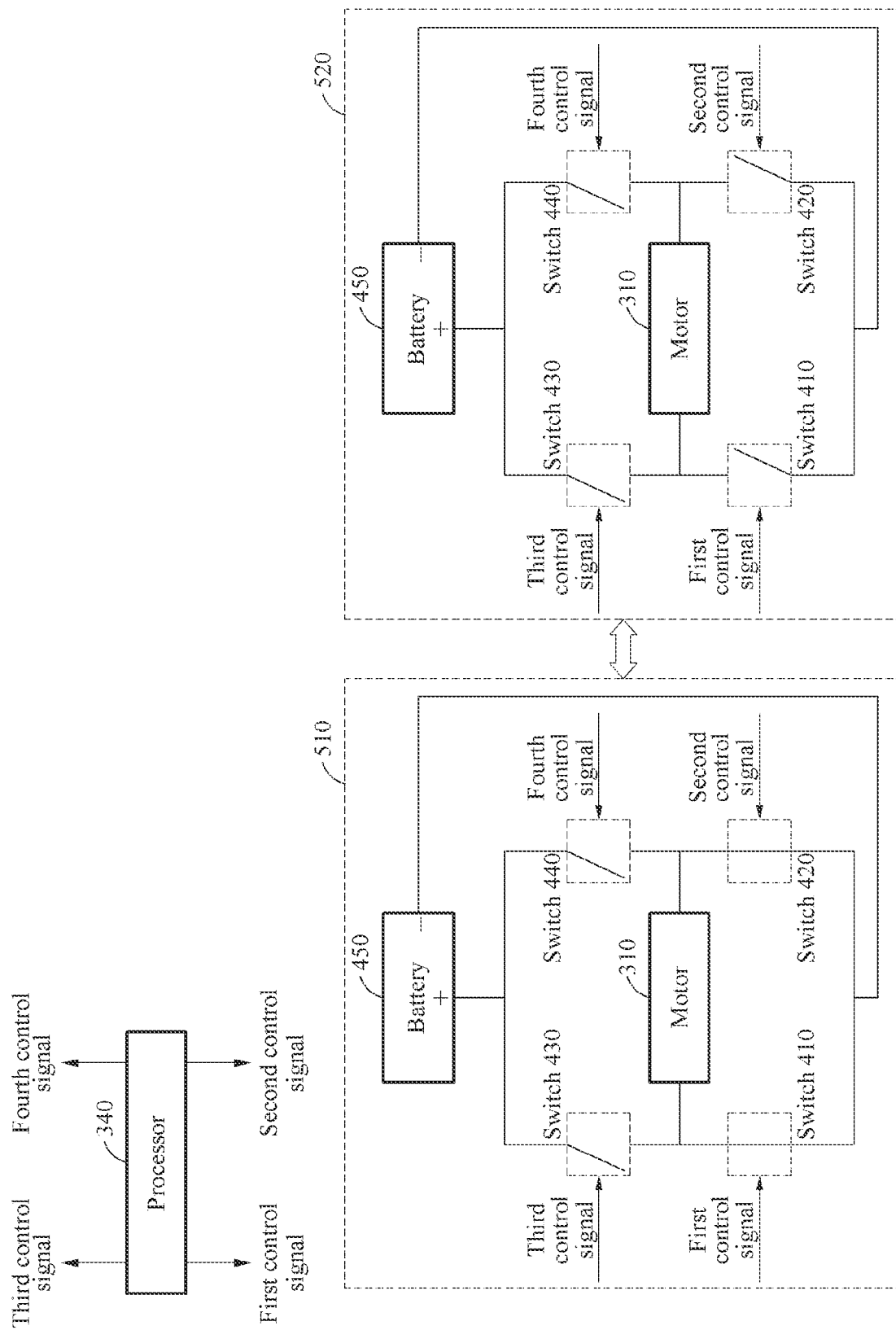
FIG. 5 illustrates a control operation of a processor according to an example embodiment.

FIG. 5 illustrates a control operation of a processor according to an example embodiment.

Referring to FIG. 5, the processor 340 may control the motor driver circuit 320 based on a control signal. In this example, it is assumed that the motor driver circuit 320 includes an H-bridge circuit configured to control an electrical connection through the plurality of switches 410, 420, 430, and 440. The processor 340 may control states (turn-ons or turn-offs) of the first switch 410, the second switch 420, the third switch 430, and the fourth switch 440 based on first, second, third, and fourth control signals, respectively.

The processor 340 may generate an exercise load by controlling the electrical connection in the motor driver circuit 320, without supplying power from the battery 450 to the motor 310. The processor 340 may break the electrical connection between the battery 450 and the motor 310 by turning off the third switch 430 and the fourth switch 440 through the third control signal and the fourth control signal, and continuously maintain a disconnection state. In a state in which the electrical connection between the battery 450 and the motor 310 is broken by turning off the third switch 430 and the fourth switch 440, the processor 340 may generate an exercise load by controlling a first control state 510 and a second control state 520 to be alternately repeated for the motor driver circuit 320. In the first control state 510, the first switch 410 and the second switch 420 are turned on by the first control signal and the second control signal, whereby the electrical connection in the motor driver circuit 320 forms a closed loop. In the second control state 510, the first switch 410 and the second switch 420 are turned off by the first control signal and the second control signal, whereby the electrical connection in the motor driver circuit 320 forms an open loop. As described above, in the first control state 510, a great rotation resistance is generated in the motor 310, such that the user feels a great resistance force in a direction opposite to the direction of the leg. In the second control state 520, no electrical force or rotation resistance is generated, such that the user feels a minimum resistive force.

The processor 340 may adjust the magnitude of the resistive force by adjusting a ratio between a duration of the first control state 510 and a duration of the second control state 520. For example, the magnitude of the resistive force that the user feels may increase as the proportion of the duration of the first control state 510 within each repeated period of time increases. Conversely, the magnitude of the resistive force that the user feels may decrease as the proportion of the duration of the second control state 520 increases.

Figure 6A:
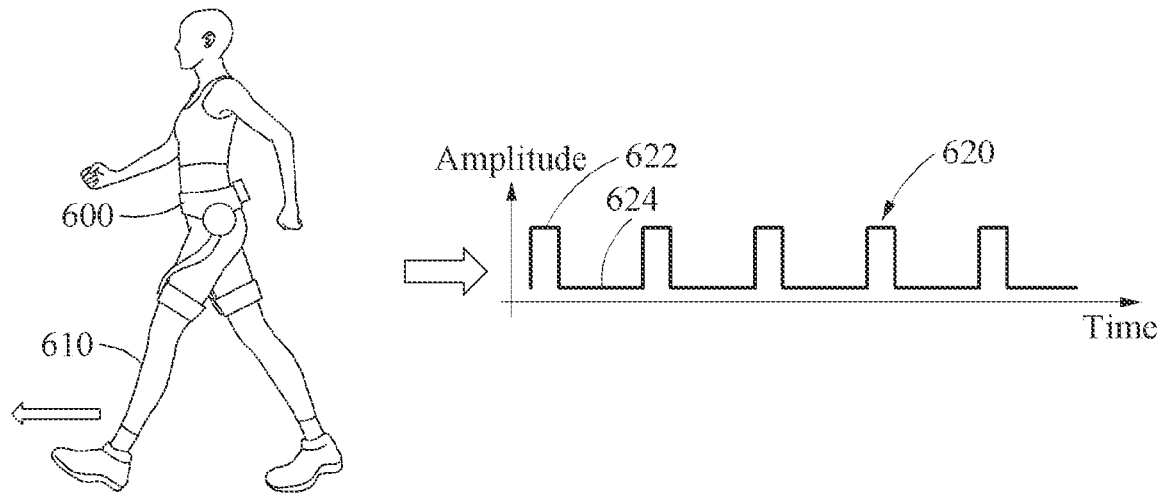
FIGS. 6A, 6B, and 6C illustrate a control operation of a processor depending on a leg motion of a user according to an example embodiment.
Figure 6B:
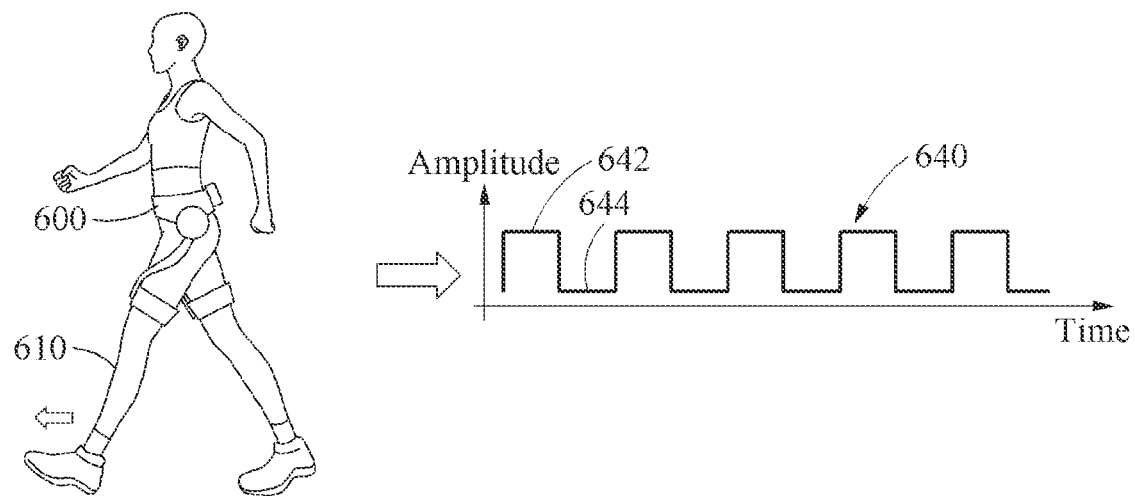
Figure 6C:
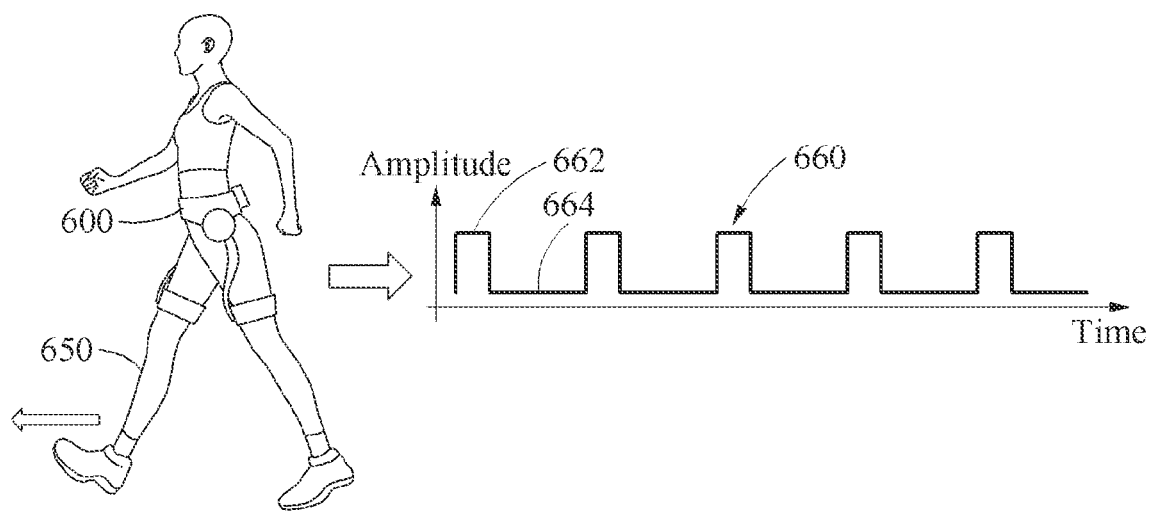

FIGS. 6A, 6B, and 6C illustrate a control operation of a processor depending on a leg motion of a user according to an example embodiment.

The processor 340 may adaptively perform the control operation described with reference to FIG. 5 on a leg motion of a user wearing a wearable device 600. FIGS. 6A and 6B are examples of control of the wearable device 600 for a left leg 610, and FIG. 6C is an example of control of the wearable device 600 for a right leg 650. For ease of description, it is assumed that the leg motion speed of the user is relatively fast in the examples of FIGS. 6A and 6C, and that the leg motion speed of the user is relatively slow in the example of FIG. 6B. In addition, it is assumed that the wearable device 600 is intended to provide a user with a target exercise load in the same magnitude in the examples of FIGS. 6A and 6B.

In the example of FIG. 6A, the processor 340 may control the switch 410 and the switch 420 included in the motor driver circuit 320 based on a control signal 620 which is in the form of a PWM signal. The control signal 620 with the same signal waveform may be supplied to the switch 410 and the switch 420. The switch 410 and the switch 420 are turned on at a high level value 622 of the control signal 620 and turned off at a low level value 624 of the control signal 620. During this control operation, the switch 430 and the switch 440 are maintained to be turned off. When the control signal 620 has a high level value 622, the first control state 510 in which the electrical connection in the motor driver circuit 320 forms a closed loop is activated. When the control signal 620 has a low level value 624, the second control state 520 in which the electrical connection in the motor driver circuit 320 forms an open loop is activated. The value of the control signal 620 periodically and repeatedly changes. Accordingly, the first control state 510 and second control state 520 are alternately repeated with a desired (or, alternatively, a predetermined) interval. The control signal 620 in the form of a PWM signal has a cycle repeated in units of hertz (Hz). As an example, the control signal 620 may control a change between the first control state 510 and the second control state 620 with a frequency of 40 KHz.

In the example of FIG. 6B, the processor 340 may control the switch 410 and the switch 420 included in the motor driver circuit 320 based on a control signal 640. The control signal 640 with the same signal waveform is supplied to the switch 410 and the switch 420. The switch 410 and the switch 420 are turned on at a high level value 642 of the control signal 640 and turned off at a low level value 644 of the control signal 640. Similar to the example of FIG. 6A, the value of the control signal 620 periodically and repeatedly changes, such that the first control state 510 and the second control state 520 are alternately repeated with a desired (or, alternatively, a predetermined) interval.

As described above, if the speed of the leg motion of the user becomes relatively slow, the user feels a relatively small exercise load. Thus, to maintain the exercise load in an intended magnitude, the proportion of the duration of the first control state 510 to the second control state 520 shown in FIG. 6A needs to be increased, such that the user may feel a relatively great exercise load. By appropriately adjusting the duration of each of the first control state 510 and the second control state 520 according to the speed of the leg motion of the user in consideration of the relationship that the magnitude of the exercise load that the user feels varies depending on the proportion of the duration of each of the first control state 510 and the second control state 520, it is possible to provide the user with an exercise load in a desired (or, alternatively, a predetermined) magnitude.

Assuming that the sensor 330 configured to sense a leg motion in the wearable device 600 is an encoder, the sensor 330 may sense a change in the rotation angle of the leg over time and transmit the sensed information as a bit value to the processor 340. The processor 340 may estimate the rotation angle of the leg motion based on the received bit value, and estimate the speed of the leg motion based on the change in the rotation angle over time. The processor 340 may provide the user with an exercise load in a desired (or, alternatively, a predetermined) magnitude by adjusting the proportion of the duration of the first control state 510 based on the estimated speed of the leg motion. For example, it is assumed that the speed of the leg motion of the user is relatively fast at the beginning as shown in the example of FIG. 6A and then, becomes slower as shown in the example of FIG. 6B. The processor 340 may adjust the control signal from the signal waveform as in the first control signal 620 to the signal waveform as in the second control signal 640, such that the proportion of the duration of the first control state 510 to the second control state 520 may be relatively increased. If a desired (or, alternatively, a predetermined) control operation is not performed when the speed of the leg motion of the user decreases, the magnitude of the exercise load that the user feels may be reduced. However, in this case, the processor 340 may compensate for the reduction in the magnitude of the exercise load that the user may feel by controlling the proportion of the duration of the first control state 510 to be increased, such that the user may feel the exercise load in a desired (or, alternatively, a predetermined) magnitude.

As another example, when the speed of the leg motion of the user is relatively slow at the beginning as in the example of FIG. 6B and then, becomes faster as in the example of FIG. 6A (if an appropriate magnitude of an exercise load is preset different from the foregoing example by the user for the leg motion of FIG. 6B), the processor 340 may adjust the control signal from the signal waveform as in the second control signal 640 to the signal waveform as in the first control signal 620, such that the proportion of the duration of the first control state 510 to the second control state 520 may be relatively reduced. If a desired (or, alternatively, a predetermined) control operation is not performed when the speed of the leg motion of the user increases, the magnitude of the exercise load that the user feels may be unintentionally increased. However, in this case, the processor 340 may compensate for the increase in the magnitude of the exercise load that the user may feel by controlling the proportion of the duration of the first control state 510 to be reduced, such that the user may feel the exercise load in a predetermined magnitude.

Referring to the example of FIG. 6C, the control of the processor 340 for providing an exercise load may be performed separately for the left leg 610 and the right leg 650 of the user. Accordingly, the magnitude of the exercise load and the control signal applied to the right leg 650 may be different from the magnitude of the exercise load and the control signal (the first control signal 620) applied to the left leg 610, respectively. In a third control signal 660 for providing an exercise load to the right leg 650, the ratio between a duration of a state having a high level value 662 and a duration of a state having a low level value 664 may be different from the ratio in the control signal (the first control signal 620) for providing an exercise load to the left leg 610.

Figure 7:
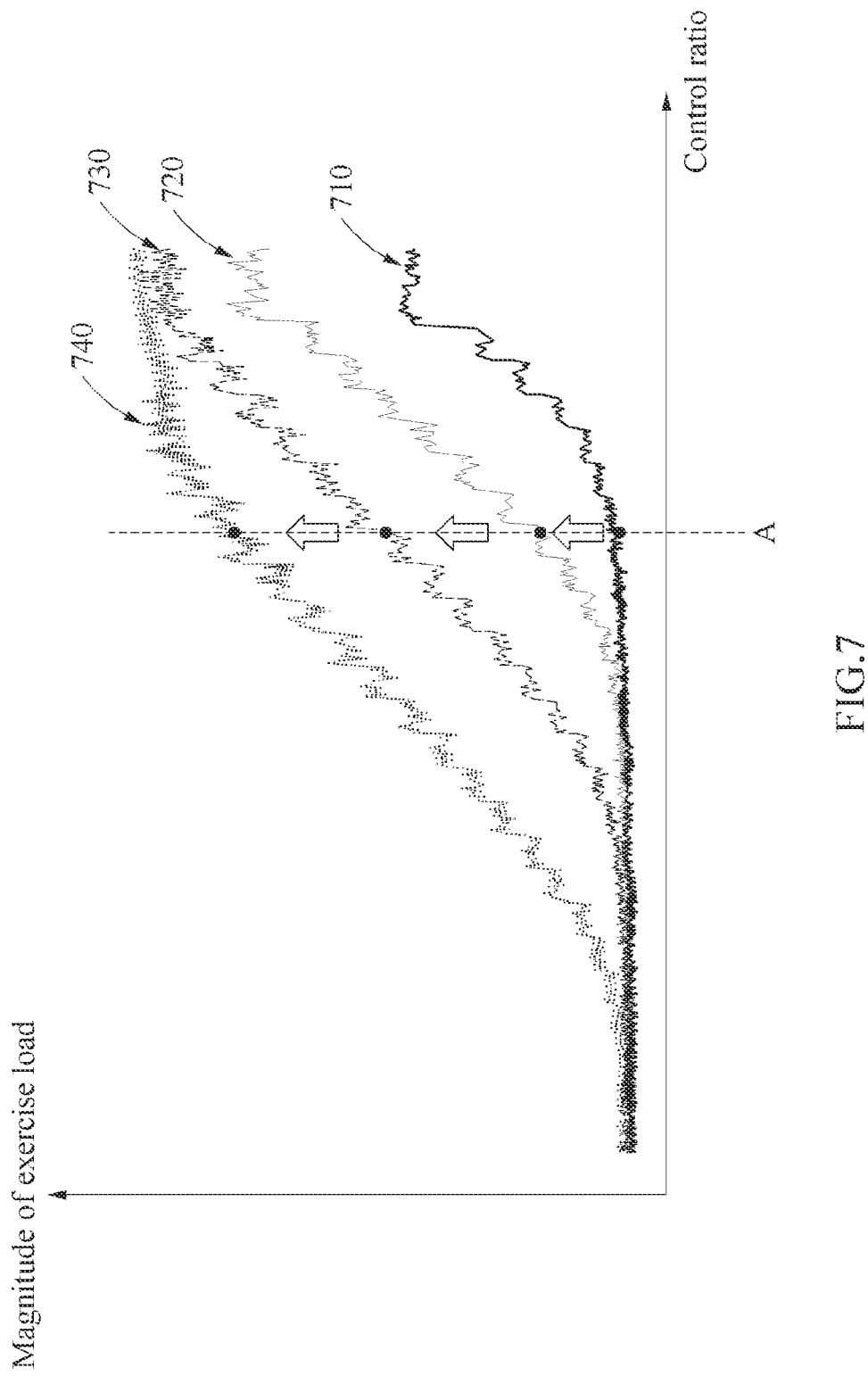
FIGS. 7 and 8 illustrate a change in a control operation of a wearable device depending on a change in speed of a leg motion according to an example embodiment.
Figure 8:
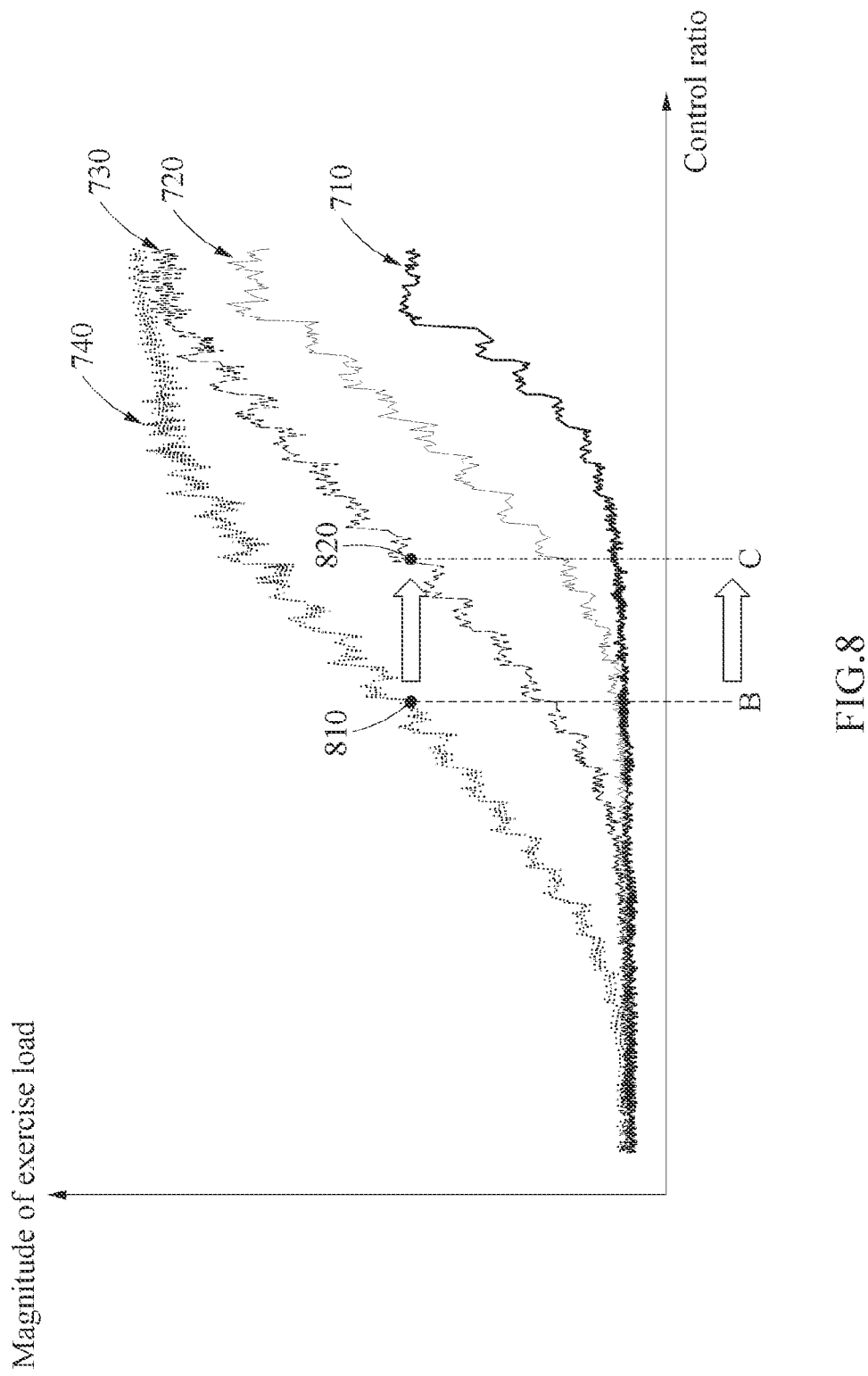

FIGS. 7 and 8 illustrate a change in a control operation of a wearable device depending on a change in leg motion speed according to an example embodiment.

FIG. 7 describes a change in a magnitude of an exercise load according to a leg motion speed of a user and a control ratio which is a ratio between the duration of the first control state 510 and the duration of the second control state 520. Waveforms 710, 720, 730, and 740 correspond to different leg motion speeds which are fixed values, respectively. The leg motion speed increases in the order of the first waveform 710, the second waveform 720, the third waveform 730, and the fourth waveform 740.

The value of the control ratio may be expressed in percent. For example, the value of the control ratio of 70% may indicate that the proportion of the duration of the first control state 510 in which the electrical connection in the motor driver circuit 320 forms a closed loop within one period is 70%, and that the proportion of the duration of the second control state 520 in which the electrical connection in the motor driver circuit 320 forms an open loop is 30%.

Assuming that the value of the control ratio remains the same, for example, assuming that the value of the control ratio is "A", it may be seen that the magnitude of the exercise load increases as the speed of the leg motion increases. Accordingly, if the user increases the speed of walking in an environment with a fixed control ratio while walking wearing a wearable device, the magnitude of an exercise load that the user feels increases. Conversely, if the user decreases the speed of walking in the environment with the fixed control ratio, the magnitude of the exercise load that the user feels decreases. In a situation where the user expects a fixed target exercise load, a change in the speed of walking of the user may lead to a change in the exercise load, which may cause the user to feel uncomfortable.

Referring to FIG. 8, the processor 340 may appropriately adjust a control ratio according to a change in the leg motion speed of the user. The sensor 330 of the wearable device 110 may measure a leg motion of the user, and the processor 340 may estimate the speed of the leg motion (for example, the rotation speed or angular velocity of a joint motion) based on the measured leg motion. The processor 340 may determine how to adjust a control ratio to provide a target exercise load using a control model stored in the memory 350 according to a change in the estimated speed of the leg motion. When a target exercise load is given and the speed of the leg motion is input into the control model, the control model may provide a control ratio for the motor driver circuit 320 to achieve the target exercise load.

It is assumed that the value of the control ratio for providing a target exercise load when the speed of the leg motion of the user at a previous point in time is a speed 810 corresponding to the fourth waveform 740 was "B". After that, if the speed of the leg motion of the user decreases to a speed 820 corresponding to the third waveform 730, the electromotive force of the motor 310 decreases in response to the speed 820, and the rotation resistive force also decreases, such that the user feels an exercise load smaller than the target exercise load previously set for the speed 810. To provide the user with the same target exercise load as before, the value of the control ratio should be increased to "C". The processor 340 may automatically increase the control ratio according to the reduced speed of the leg motion, thereby maintaining the target exercise load in a desired (or, alternatively, a predetermined) magnitude. For example, in the example of FIG. 6A, it is assumed that the speed of the leg motion of the user corresponds to the speed 810 and the processor 340 is controlling the motor driver circuit 320 based on the control signal 620. After that, if the speed of the leg motion of the user decreases to the speed 820 which is slower than the previous speed 810, the processor 340 may change the control signal for the motor driver circuit 320 to the control signal 640 by increasing the proportion of the duration of the first control state 510 to the second control state 520 in the previous control signal 620. Through such a change of the control signal, the user may feel the exercise load in the same magnitude even when reducing the speed of the leg motion of the user.

Figure 9:
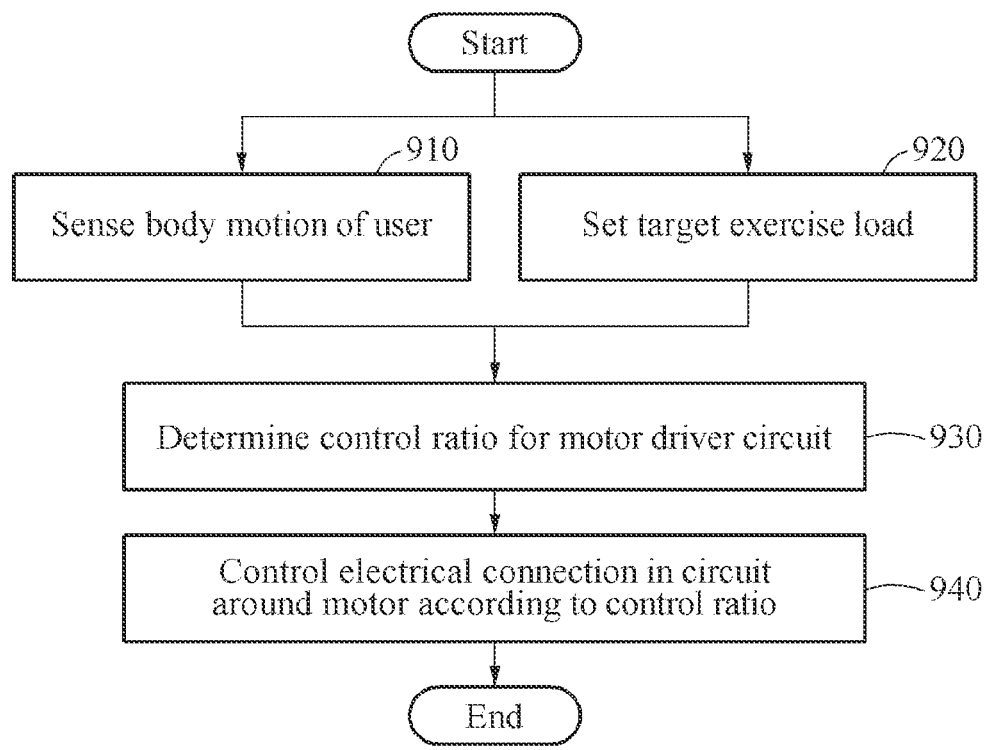
FIG. 9 is a flowchart illustrating an operation method of a wearable device according to an example embodiment.

FIG. 9 is a flowchart illustrating an operation method of a wearable device according to an example embodiment.

Referring to FIG. 9, in operation 910, the sensor 330 senses a body motion of a user. Information on the body motion sensed by the sensor 330 may be transmitted to the processor 340, and the processor 340 may determine the speed of the body motion based on the information on the body motion. For example, information related to a change in the rotation position and the rotation angle according to the leg motion of the user may be transmitted from the sensor 330 to the processor 340, and the processor 340 may calculate the speed of the body motion by processing the information received from the sensor 330.

In operation 920, the processor 340 sets a target exercise load to be provided to the user. The target exercise load may have a value that is fixed or varies over time. The target exercise load may be determined, for example, based on an exercise intensity selected by the user, or may be determined by the processor 340 executing software configured to adjust the magnitude of the exercise load with time by an algorithm. Operations 910 and 920 may be performed in parallel or may be sequentially performed in any order.

In some example embodiments, the wearable device 300 may further include a communicator configured to communicate with an external device, for example, a remote controller. The remote controller may provide a user interface (UI) that enables an operation or manipulation of the wearable device 300, and a user may control a function and operation of the wearable device 300 through the UI. The remote controller may be controlled by a user, where the user may be a wearer of the wearable device 300 or a third party, such as a therapist or doctor. The user may set or adjust the target exercise load through the remote controller.

In operation 930, the processor 340 may generate a control signal to control the motor driver circuit 320 of the wearable device based on the speed of the sensed body motion. The processor 340 may determine the speed of the body motion based on the sensed body motion, and generate a control signal to adjust a control ratio, which is a ratio between a duration of a first control state in which the electrical connection in the motor driver circuit 320 is a closed loop and a duration of a second control state in which the electrical connection in the motor driver circuit 320 is an open loop, based on the determined speed. The control ratio may correspond to a changing ratio per time between the first control state and the second control state. When the speed of the body motion changes, the processor 340 may generate the control signal to adjust the control ratio to correspond to the changed speed of the body motion, to provide the intended target exercise load.

When the speed of the body motion increases, the processor 340 may generate the control signal to adjust the control ratio by reducing the duration of the first control state and increasing the duration of the second control state. Conversely, when the speed of the body motion decreases, the processor 340 may generate the control signal to adjust the control ratio by increasing the duration of the first control state and reducing the duration of the second control state.

In operation 940, the processor 340 may control the electrical connection in the motor driver circuit 320 based on the control signal. The processor 340 may control a change between the first state in which the electrical connection in the motor driver circuit 320 is a closed loop and the second control state in which the electrical connection in the motor driver circuit 320 is an open loop. The processor 340 may control the electrical connection in the motor driver circuit 320 such that the first control state and the second control state may be periodically and alternately repeated, thereby providing an exercise load according to the speed of the body motion of the user through the frame connected to the motor 310.

In some example embodiments, the wearable device 300 may operate in a hybrid mode, where the wearable device 300 automatically switches between controlling the motor 310 to provide the resistance force, as discussed above, and to provide an assistance force to assist the user with walking. For example, in some example embodiments, the user may enter a particular muscle or exercise the user wishes to focus on, and the processor 340 may selectively provide the exercise load during certain portions of a gait cycle corresponding to the desired muscle to exercise to increase a muscular strength or rehabilitate the desired muscle and may selectively provide the assistance force during other portions of the gait cycle to assist the user. For example, hip muscles and hamstrings muscles behind a knee of the user, and quadriceps muscles in front of the knee may be differently activated based on gait phase, and the wearable device 300 may provide the exercise load during the portion of the gait phase corresponding to the desired muscles.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A wearable device comprising:
   a motor;
   a motor driver circuit configured to control an operation of the motor;
   a sensor configured to sense a body motion of a user; and
   at least one processor comprising processing circuitry individually and/or collectively configured to:
   adjust a changing ratio per time between a duration of a first control state and a duration of a second control state based on the sensed body motion of the user, the first control state being a state in which an electrical connection in the motor driver circuit is a closed loop and the second control state being a state in which the electrical connection in the motor driver circuit is an open loop; and
   generate a control signal to control the electrical connection in the motor driver circuit to provide an exercise load based on the adjusted changing ratio per time.

2. The wearable device of claim 1, wherein the at least one processor is further configured to periodically and alternately repeat switching between the first control state and the second control state based on the changing ratio per time.

3. The wearable device of claim 1, wherein the at least one processor is further configured to,
   determine the speed of the body motion based on the body motion, and
   adjust the changing ratio per time between the duration of the first control state and the duration of the second control state based on the speed of the body motion.

4. The wearable device of claim 3, wherein the at least one processor is further configured to adjust the changing ratio per time to correspond to a second speed when the speed of the body motion changes from a first speed to the second speed.

5. The wearable device of claim 4, wherein the at least one processor is further configured to adjust the changing ratio per time by reducing the duration of the first control state and increasing the duration of the second control state when the second speed is greater than the first speed.

6. The wearable device of claim 4, wherein the at least one processor is further configured to adjust the changing ratio per time by increasing the duration of the first control state and reducing the duration of the second control state when the second speed is less than the first speed.

7. The wearable device of claim 3, wherein the at least one processor is further configured to adjust the changing ratio per time based on a target exercise load and the speed of the body motion.

8. The wearable device of claim 7, wherein the at least one processor is configured to receive an input of the target exercise load from the user.

9. The wearable device of claim 1, wherein the at least one processor is further configured to generate the exercise load by forming the closed loop in the first control state without driving the motor using power of a battery.

10. The wearable device of claim 1, wherein the at least one processor is further configured to control the motor to generate a torque in a direction that hinders the body motion by supplying the motor with power of a battery, and generating the exercise load by controlling a change between the first control state and the second control state.

11. The wearable device of claim 1, wherein the motor driver circuit comprises:
   a plurality of switches configured to control the electrical connection in the motor driver circuit based on the control signal.

12. The wearable device of claim 1, wherein the wearable device is configured to be worn on a lower part of the body of the user to provide a resistive force to the lower body of the user.

13. A method of operating a wearable device, the wearable device including a motor and a motor driver circuit configured to control an operation of the motor, the method comprising:
   sensing, via a sensor, a body motion of a user;
   adjusting a changing ratio per time between a duration of a first control state and a duration of a second control state based on the sensed body motion of the user, the first control state being a state in which an electrical connection in the motor driver circuit is a closed loop and the second control state being a state in which the electrical connection in the motor driver circuit is an open loop; and
   generating a control signal to control the electrical connection in the motor driver circuit to provide an exercise load based on the adjusted changing ratio per time.

14. The method of claim 13, wherein the generating the control signal generates the control signal to periodically and alternately repeat switching between the first control state and the second control state.

15. The method of claim 13, wherein the generating the control signal comprises:
   determining the speed of the body motion based on the body motion; and
   generating the control signal to adjust the changing ratio per time between the duration of the first control state and the duration of the second control state based on the speed of the body motion.

16. The method of claim 15, wherein the generating the control signal comprises generating the control signal to adjust the changing ratio per time to correspond to a second speed, in response to the speed of the body motion changing from a first speed to the second speed.

17. The method of claim 16, wherein the generating the control signal comprises generating the control signal to adjust the changing ratio per time by reducing the duration of the first control state and increasing the duration of the second control state, in response to the second speed being greater than the first speed.

18. The method of claim 16, wherein the generating the control signal comprises generating the control signal to adjust the changing ratio per time by increasing the duration of the first control state and reducing the duration of the second control state, in response to the second speed being less than the first speed.

19. A non-transitory computer-readable storage medium storing instructions executable by at least one processor to perform a method of operating a wearable device, the wearable device including a motor and a motor driver circuit configured to control an operation of the motor, the method comprising:
   sensing, via a sensor, a body motion of a user;
   adjusting a changing ratio per time between a duration of a first control state and a duration of a second control state based on the sensed body motion of the user, the first control state being a state in which an electrical connection in the motor driver circuit is a closed loop and the second control state being a state in which the electrical connection in the motor driver circuit is an open loop; and
   generating a control signal to control the electrical connection in the motor driver circuit to provide an exercise load based on the adjusted changing ratio per time.

* * * * *